US012036850B2

(12) United States Patent
Park

(10) Patent No.: US 12,036,850 B2
(45) Date of Patent: Jul. 16, 2024

(54) WIRE ASSEMBLY FOR ANTI-PINCH SENSOR FOR VEHICLE

(71) Applicants: Hyundai Motor Company, Seoul (KR); Kia Corporation, Seoul (KR)

(72) Inventor: Seung-Young Park, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/960,316

(22) Filed: Oct. 5, 2022

(65) Prior Publication Data

US 2023/0203851 A1    Jun. 29, 2023

(30) Foreign Application Priority Data

Dec. 23, 2021 (KR) ........................ 10-2021-0185947

(51) Int. Cl.
*E05F 15/00* (2015.01)
*B60J 10/80* (2016.01)
*E05F 15/44* (2015.01)
*E05F 15/46* (2015.01)

(52) U.S. Cl.
CPC .............. *B60J 10/80* (2016.02); *E05F 15/44* (2015.01); *E05F 15/46* (2015.01); *E05Y 2900/506* (2013.01); *E05Y 2900/531* (2013.01)

(58) Field of Classification Search
CPC ................................. E05F 15/44; E05F 15/46
USPC ............................................... 49/26, 27, 28
See application file for complete search history.

(56) References Cited

U.S. PATENT DOCUMENTS

| 6,234,565 | B1* | 5/2001 | Bryant | E05D 3/127 |
| | | | | 296/146.12 |
| 6,350,956 | B1* | 2/2002 | Sakata | B60R 16/0215 |
| | | | | 174/101 |
| 9,956,928 | B2* | 5/2018 | Hartwig | E05F 15/632 |
| 10,717,399 | B2* | 7/2020 | Kogure | B60R 16/0215 |
| 2018/0304830 | A1* | 10/2018 | Link | H02G 3/0462 |
| 2023/0158867 | A1* | 5/2023 | Nguyen | B60J 5/0493 |
| | | | | 296/146.9 |

FOREIGN PATENT DOCUMENTS

KR    10-2007-0047465 A        5/2007
KR       20070047465    *    5/2007    ............... B60J 5/06

\* cited by examiner

*Primary Examiner* — Daniel J Troy
*Assistant Examiner* — Daniel Alvarez
(74) *Attorney, Agent, or Firm* — Fox Rothschild LLP

(57) ABSTRACT

Provided is a wire assembly for an anti-pinch sensor for a vehicle electrically connecting the anti-pinch sensor installed on one side of a door for the vehicle to detect the pinch between the door and a vehicle body with a controller configured to control an opening or closing of the door. The wire assembly includes: a lead wire unit connected to the anti-pinch sensor; a center wire unit having one end connected to the lead wire unit and installed on a folded portion of the door; and a connection wire unit having one end connected to the other end of the center wire unit, having the other end connected to the controller, and drawn out to the outside from the inside of the door through the door.

18 Claims, 11 Drawing Sheets

WIRE ASSEMBLY FOR ANTI-PINCH SENSOR FOR VEHICLE

CROSS-REFERENCE TO RELATED APPLICATION

This application is based on and claims under 35 U.S.C. § 119(a) priority to Korean Patent Application No. 10-2021-0185947, filed on Dec. 23, 2021, which is incorporated herein by reference in its entirety.

TECHNICAL FIELD

Embodiments of the present disclosure relate to a wire assembly for an anti-pinch sensor for a vehicle, which connects an anti-pinch sensor installed in a weather strip for a vehicle with a controller.

BACKGROUND

An anti-pinch sensor configured to detect that a passenger's body is pinched between a door and a vehicle body upon getting on or off the vehicle is installed on the door for the vehicle.

Among vehicles, for a bus, particularly, an urban bus where passengers get on or off frequently, the anti-pinch sensor (APS) is provided to detect that the passenger's body is pinched to the door when the door is closed. When the anti-pinch sensor detects that the passenger is pinched, the door is opened again, thereby preventing a safety accident caused by a body, such as a hand (H), pinched between the door and the vehicle body such as a frame 111.

A front door 120 of a bus 100 can be provided as a folding door. In general, the folding door 120 has a first member 121 and a second member 122 foldably connected to each other and connects the first member 121 to an actuator 131 through a rod 132. In a state where the folding door 120 is unfolded, when the actuator 131 is operated to pull the rod 132, the first member 121 and the second member 122 are operated to be folded, and therefore, the folding door 120 is opened.

A weather strip 140 for airtightness is applied to the other end (end not connected to the first member) of the second member 122 and the vehicle body being in contact therewith, respectively. In particular, the anti-pinch sensor 150 is installed in the weather strip 140 installed on the vehicle body that is in contact with the other end of the second member 122 in a height direction of the vehicle. Since the anti-pinch sensor 150 is connected to a controller 133 configured to control an operation of the actuator 131, the controller 133 operates the actuator 131 so that the folding door 120 is unfolded when the anti-pinch sensor 150 detects the pinch.

Meanwhile, as the anti-pinch sensor 150 is installed on the vehicle body side, there is a problem in that the width of an opened region is reduced when the folding door 120 is opened by the thickness of the anti-pinch sensor 150. When the folding door 120 is opened, the width of the opened region is also limited by regulations, and the larger the opened region is, the more advantageous it is for the passenger to get on or off. However, there is a problem in that the width of the opened region is reduced by the thickness of the anti-pinch sensor 150.

If the anti-pinch sensor 150 is to be installed on the folding door 120 to solve this problem, there is a problem in that as the folding door 120 is repeatedly folded, it is also difficult to firmly mount a wire connecting the anti-pinch sensor 150 with the controller 133, and durability is lowered.

The contents described in Description of Related Art are to help the understanding of the background of the present disclosure and may include what is not previously known to those skilled in the art to which the present disclosure pertains.

SUMMARY

Provided in embodiments of the present disclosure is a wire assembly for an anti-pinch sensor for a vehicle, which can firmly maintain a mounted state even while connecting the anti-pinch sensor installed in a weather strip on a door side with a controller installed on a vehicle body.

In one aspect, a wire assembly is provided comprising: (a) an anti-pinch sensor; (b) a lead wire unit configured connected to an anti-pinch sensor; (c) a center wire unit having one end connected to the lead wire unit and configured to be installed on a vehicle door; (d) a controller configured to control an opening or closing of the vehicle door; and (e) a connection wire unit having one end connected to the other end of the center wire unit, having the other end connected to the controller. In certain preferred aspects, the anti-pinch sensor is configured to be installed on the vehicle door to detect the pinch between the door and vehicle.

In a further aspect, a wire assembly is provided for an anti-pinch sensor for a vehicle electrically connecting the anti-pinch sensor installed on one side of a door for the vehicle to detect the pinch between the door and a vehicle body with a controller configured to control an opening or closing of the door including: a lead wire unit connected to the anti-pinch sensor; a center wire unit having one end connected to the lead wire unit and installed on a folded portion of the door; and a connection wire unit having one end connected to the other end of the center wire unit, having the other end connected to the controller, and drawn out to the outside from the inside of the door by passing through the door.

In certain aspects, the center wire unit includes: a center wire connecting the lead wire unit with the connection wire unit; a coil unit having the center wire wound in a coil form from the center of the center wire and expanded and contracted in a longitudinal direction of the center wire unit; and a wire cover wound around the outside of the center wire.

In certain aspects, the wire cover is formed of a metal cable and formed to be wound around the outside of the center wire.

In certain aspects, a cable guide is suitably configured to support the outside of the wire cover is provided because the wire cover is pinched to the door wen penetrating the folded portion of the door.

In certain aspects, the cable guide is installed in a center weather strip installed on the folded portion of the door.

In certain aspects, the cable guide is suitably fixed to the door with a hook installed on a rear end of the cable guide on the folded portion of the door.

In certain aspects, a connector is suitably connected to the lead wire unit and the connection wire unit is formed on both ends of the center wire unit, respectively.

In certain aspects, the center wire unit is suitably fixed to the door with a cable tie at a position adjacent to the connector.

In certain aspects, the lead wire unit includes: a lead wire electrically connecting the anti-pinch sensor with the center wire unit; and a connector provided on the end of the lead wire and connected to the center wire unit.

In certain aspects, the lead wire unit is suitably fixed to the door with a cable tie at a position adjacent to the connector.

In certain aspects, the connection wire unit includes: a connection wire connecting the center wire unit with the controller; and a connector provided on the end of the connection wire and connected to the center wire unit.

In certain aspects, the connection wire unit is fixed to the door with a cable tie at a position adjacent to the connector.

In certain aspects, the lead wire unit, the center wire unit, and the connection wire unit are suitably installed along an inner circumference of the door.

In certain aspects, the door is suitably a folding door composed of a first member hinge-connected to a vehicle body and rotated by an actuator and a second member foldably installed on the first member.

In certain aspects, the anti-pinch sensor is suitably installed on a portion where the second member is in contact with the vehicle body in a height direction of the vehicle, and the lead wire unit is installed in the second member.

In certain aspects, the center wire unit is suitably installed over the first member and the second member.

In certain aspects, the connection wire unit suitably has a part of the connection wire unit installed in the first member and has the rest of the connection wire unit connected to the controller through the first member and a step panel of the vehicle.

In certain aspects, the anti-pinch sensor is suitably installed on one side of the door and installed in a weather strip airtightly sealing between the door and the vehicle body when the door is closed.

Accordingly certain aspects, with the anti-pinch sensor installed on the end of the door, effectively no space is required for installing the anti-pinch sensor in the vehicle body, so that the opened region is not narrowed when the door is opened.

In addition, the change in the length according to the folding of the door is absorbed by the coil unit and reinforced by the wire cover on the folded portion of the door, thereby improving durability.

As discussed, the system suitably includes use of a controller or processor.

In another embodiment, vehicles are provided that comprise a wire assembly as disclosed herein.

Thus, in one aspect, a vehicle comprising a wire assembly is provided, wherein the wire assembly comprises: (a) an anti-pinch sensor; a lead wire unit configured connected to an anti-pinch sensor; (b) a center wire unit having one end connected to the lead wire unit and configured to be installed on a door of the vehicle; (c) a controller configured to control an opening or closing of the vehicle door; and (d) a connection wire unit having one end connected to the other end of the center wire unit, having the other end connected to the controller, and drawn out to the outside from the inside of the vehicle door by passing through the vehicle door.

In a preferred aspect, the vehicle door is a folding door composed of a first member hinge-connected to a vehicle body and rotated by an actuator and a second member foldably installed on the first member.

In a certain aspect, the anti-pinch sensor is installed on a portion where the second member is in contact with the vehicle body in a height direction of the vehicle, and the lead wire unit is installed in the second member.

In a further aspect, the center wire unit is installed over the first door member and the second door member of the vehicle.

In certain aspects, the connection wire unit has a part of the connection wire installed in the first door member and has the rest of the connection wire connected to the controller through the first door member and a step panel of the vehicle.

In certain aspects, the anti-pinch sensor is installed on one side of the vehicle door and installed in a weather strip airtightly sealing between the vehicle door and the vehicle body when the door is closed.

Other aspects are disclosed infra.

DESCRIPTION OF SPECIFIC EMBODIMENTS

Figure 1:
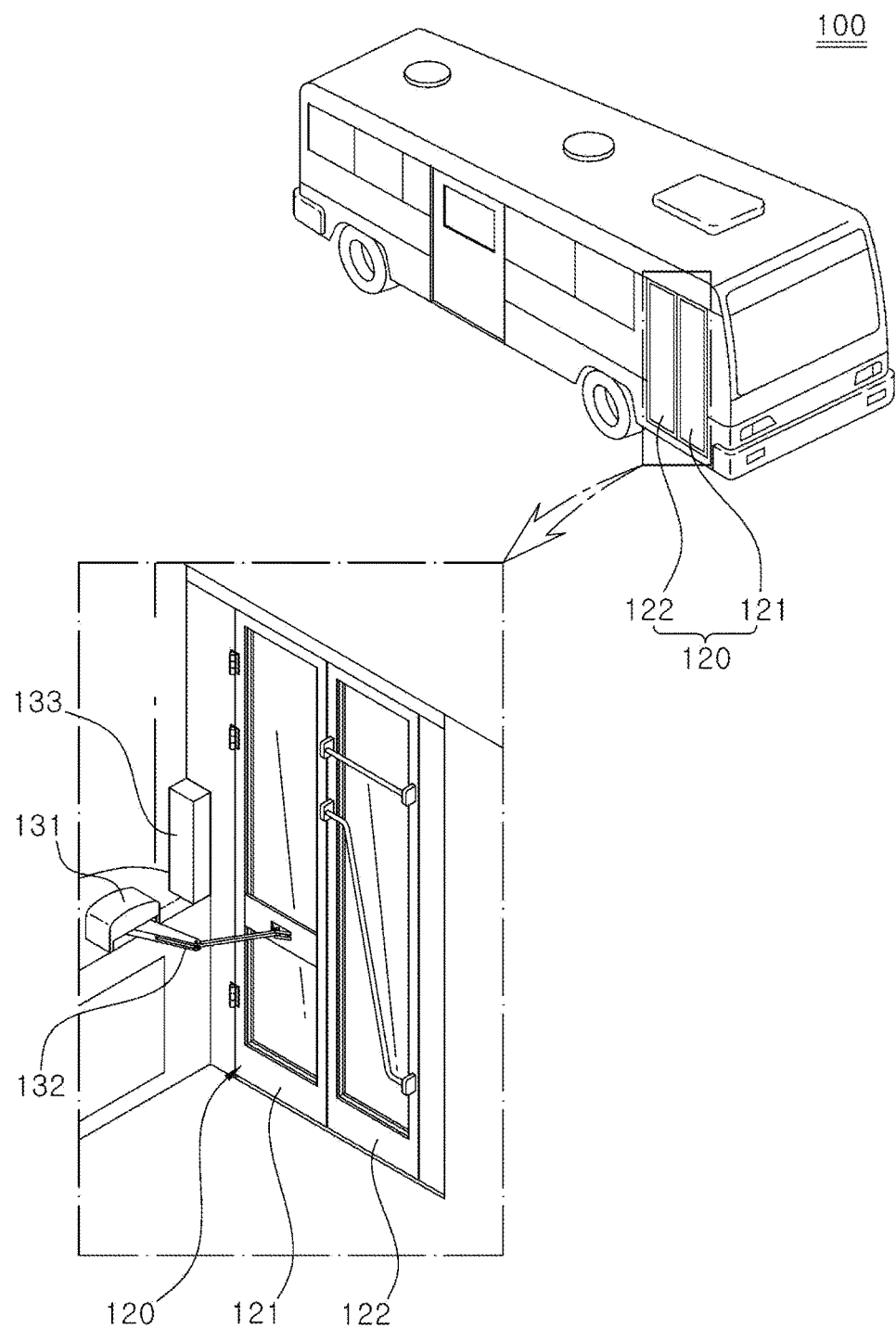
FIG. 1 is a schematic diagram showing a structure of a folding door in a bus.
Figure 2:
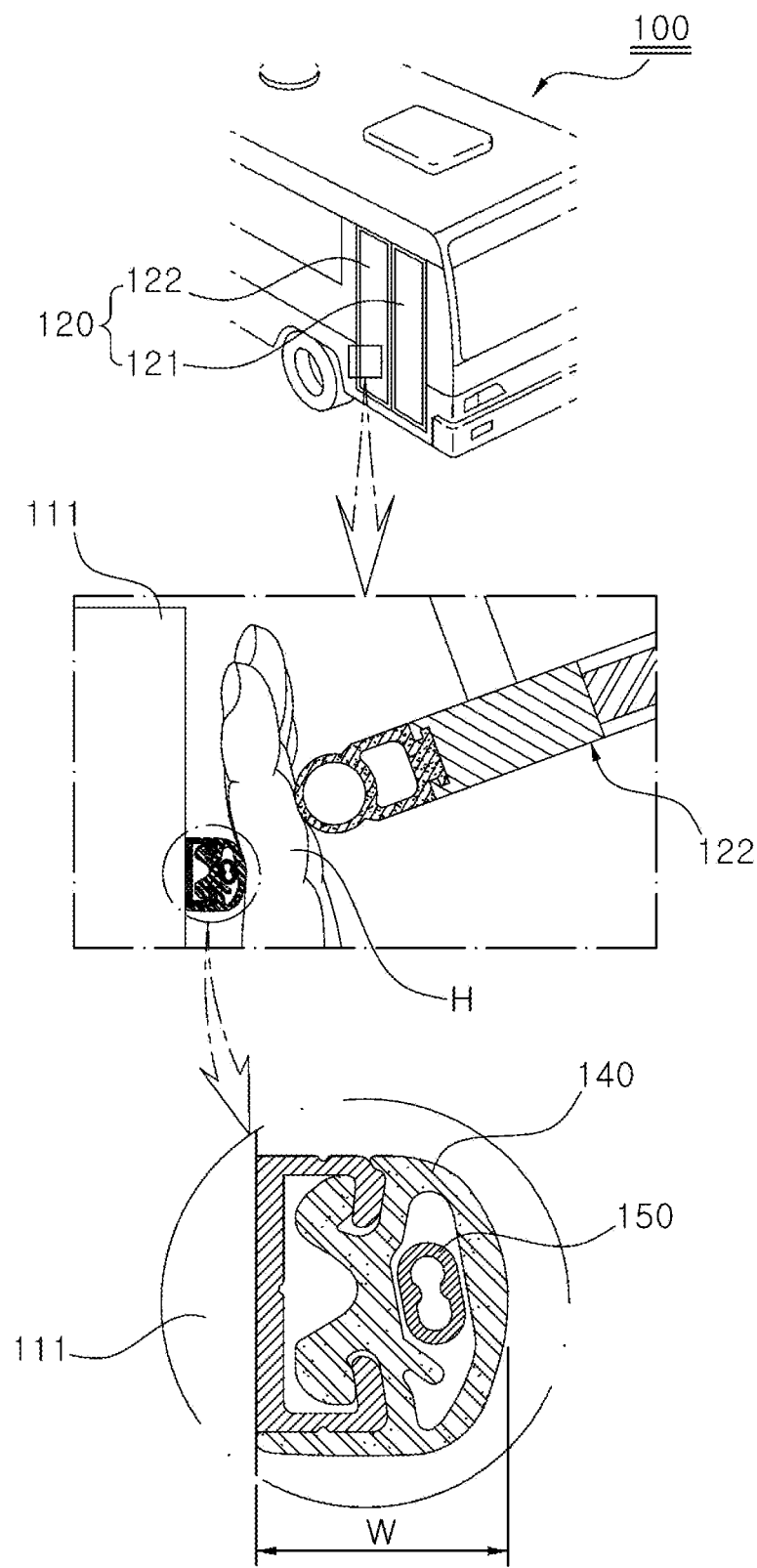
FIG. 2 is a schematic diagram showing a state where the anti-pinch sensor is installed on a vehicle body side and operated.
Figure 3:
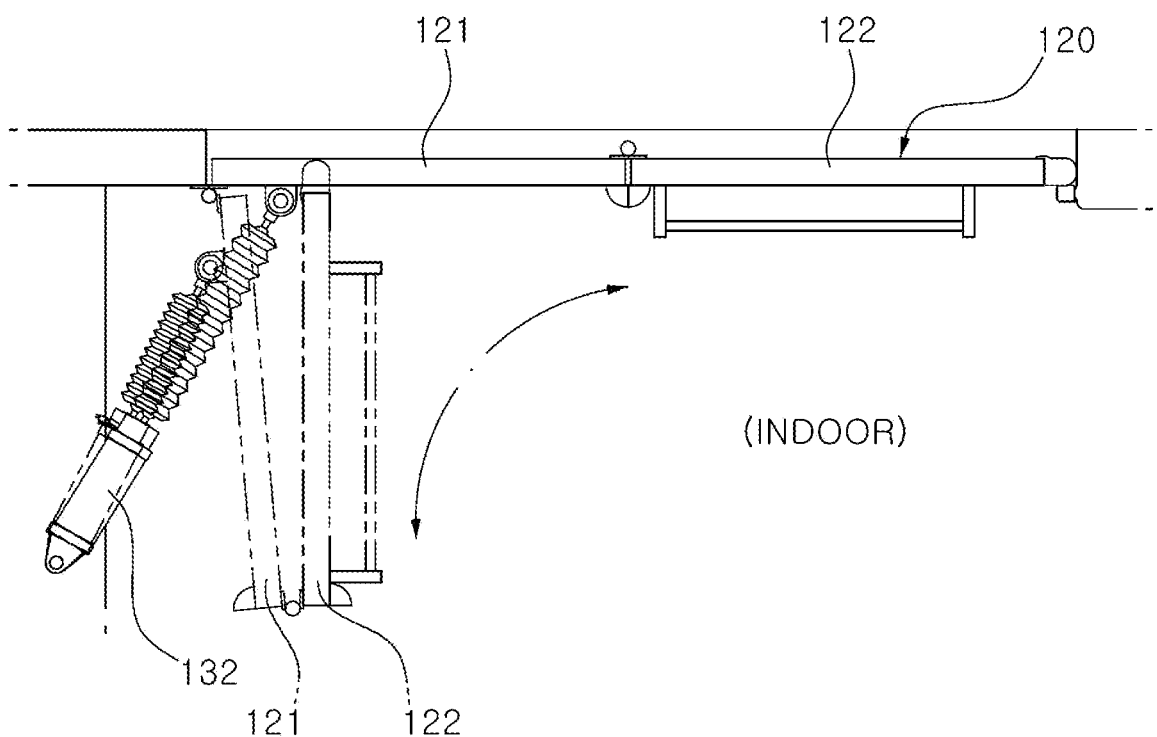
FIG. 3 is a schematic diagram showing a folded state of the folding door in the bus.
Figure 4:
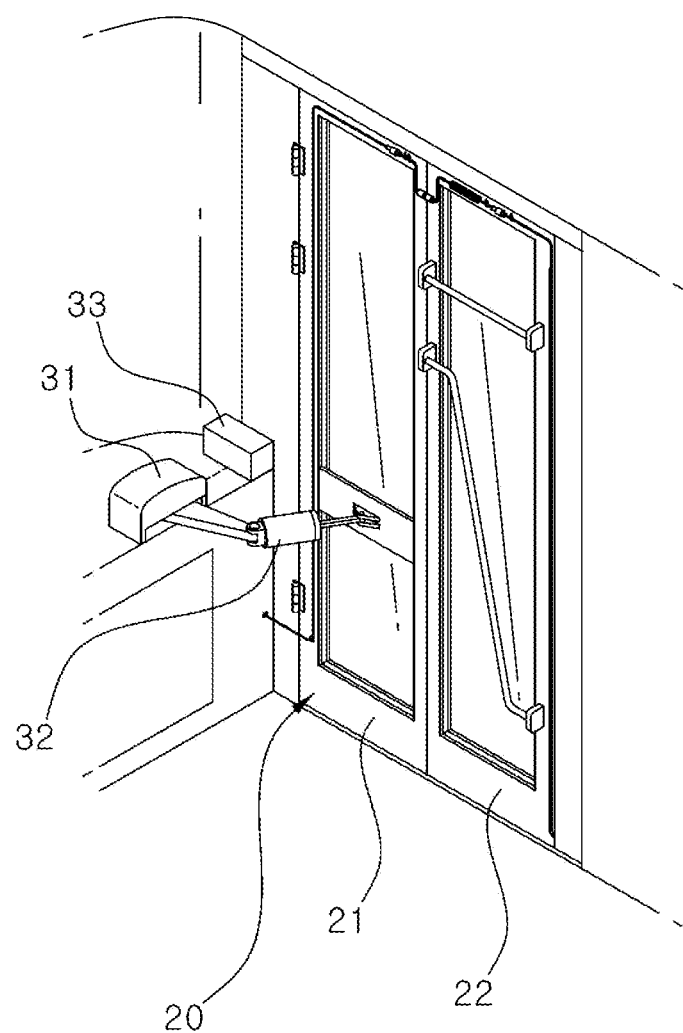
FIG. 4 is a perspective diagram showing the structure of the folding door to which a wire assembly for the anti-pinch sensor for the vehicle according to embodiments of the present disclosure is applied.
Figure 5:
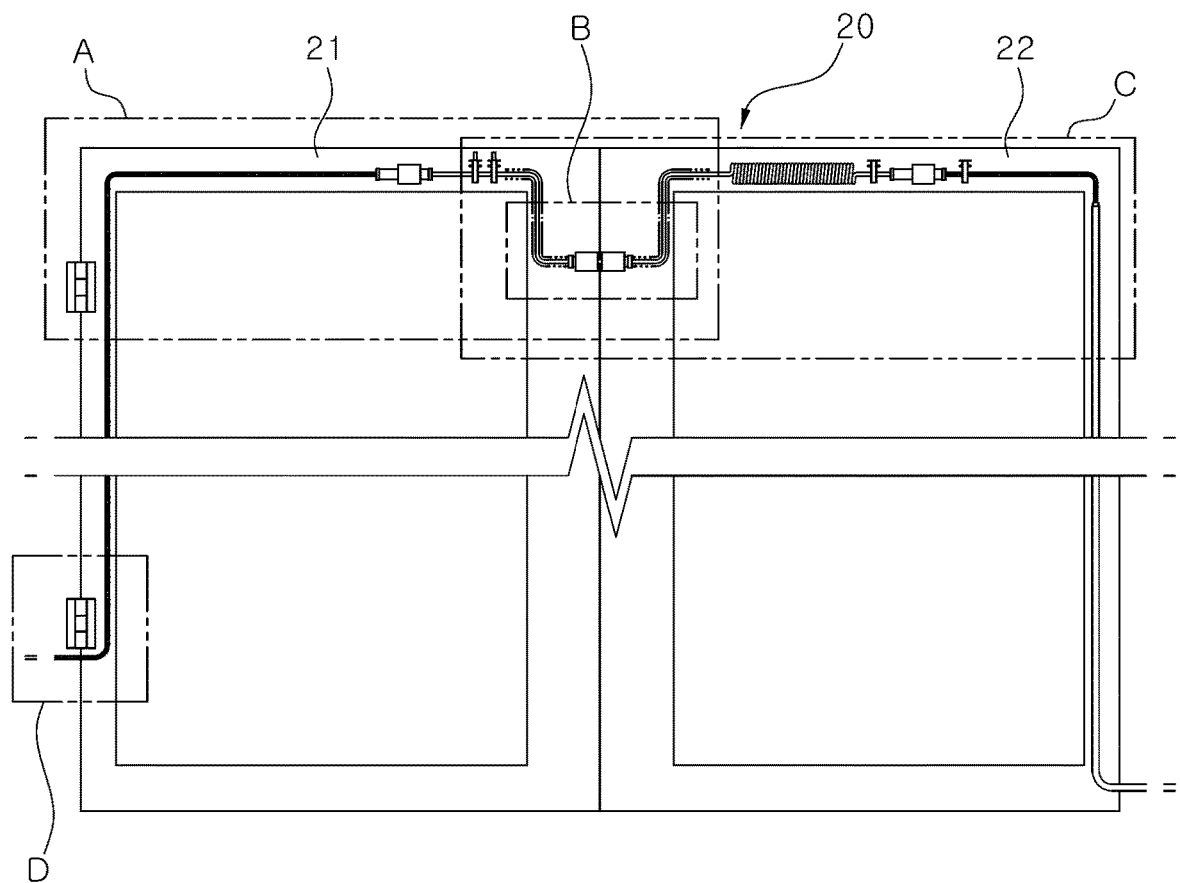
FIG. 5 is a front diagram showing the structure of the folding door to which the wire assembly for the anti-pinch sensor for the vehicle according to embodiments of the present disclosure is applied.
Figure 6:
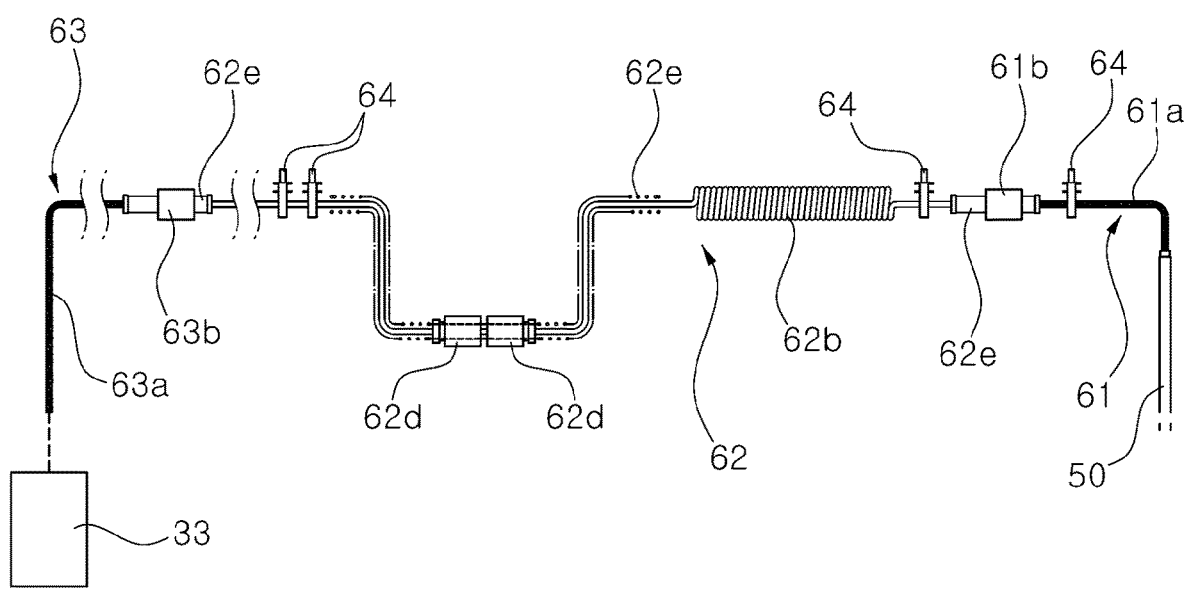
FIG. 6 is a schematic diagram showing the wire assembly for the anti-pinch sensor for the vehicle according to embodiments of the present disclosure.
Figure 7:
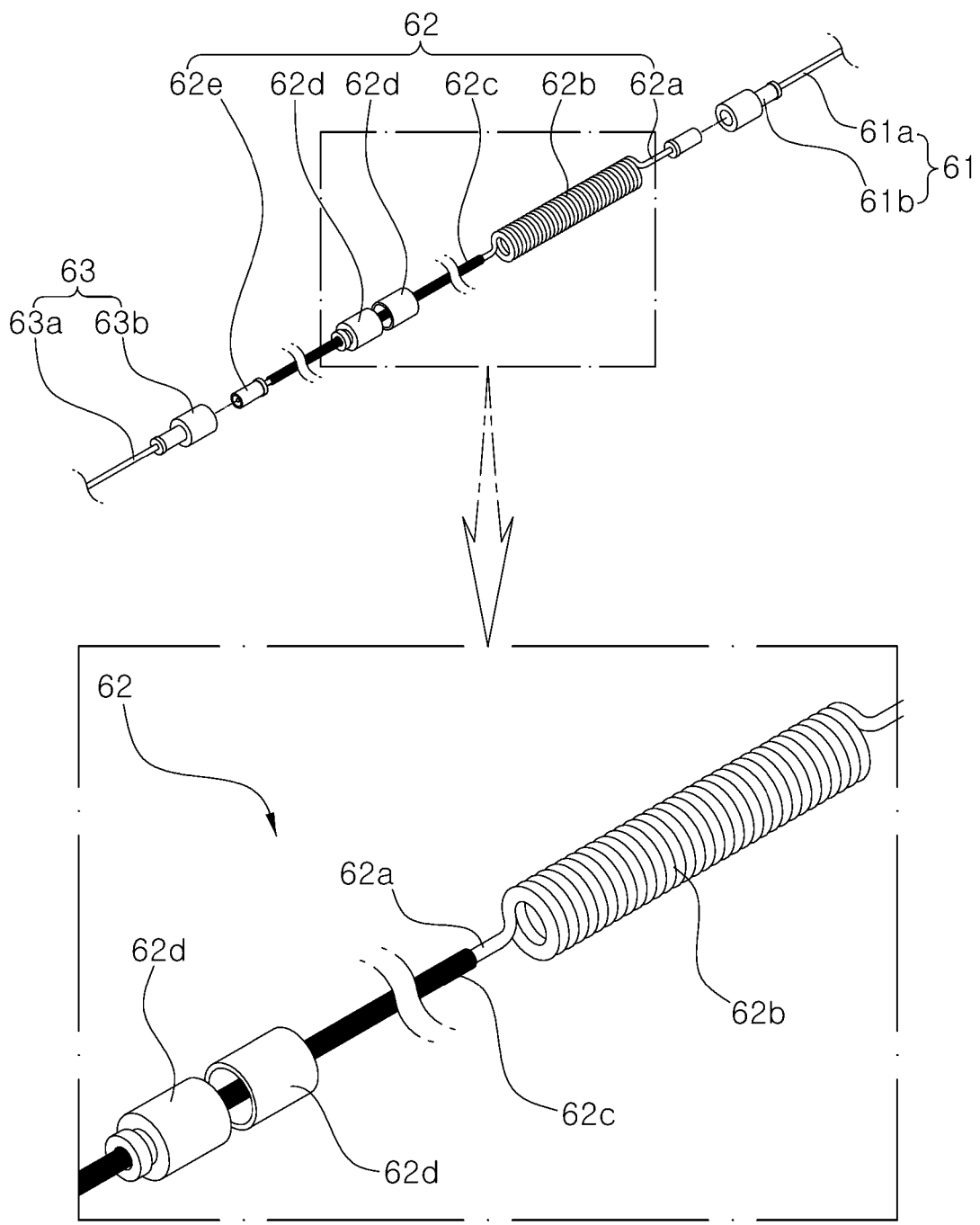
FIG. 7 is an enlarged perspective diagram showing a center wire unit in the wire assembly for the anti-pinch sensor for the vehicle according to embodiments of the present disclosure.
Figure 8:
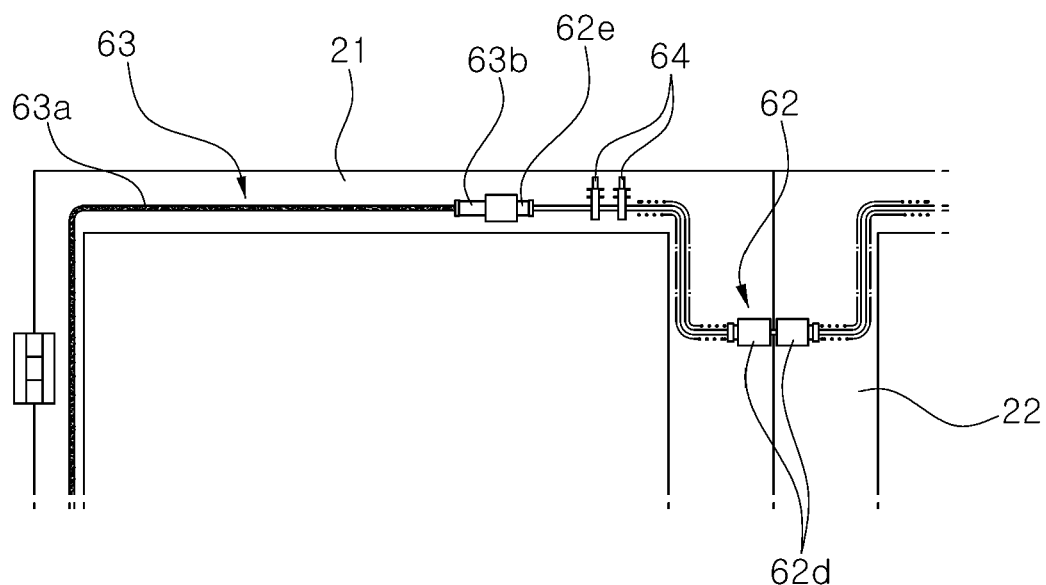
FIG. 8 is an enlarged diagram of a portion A of FIG. 5.
Figure 9:
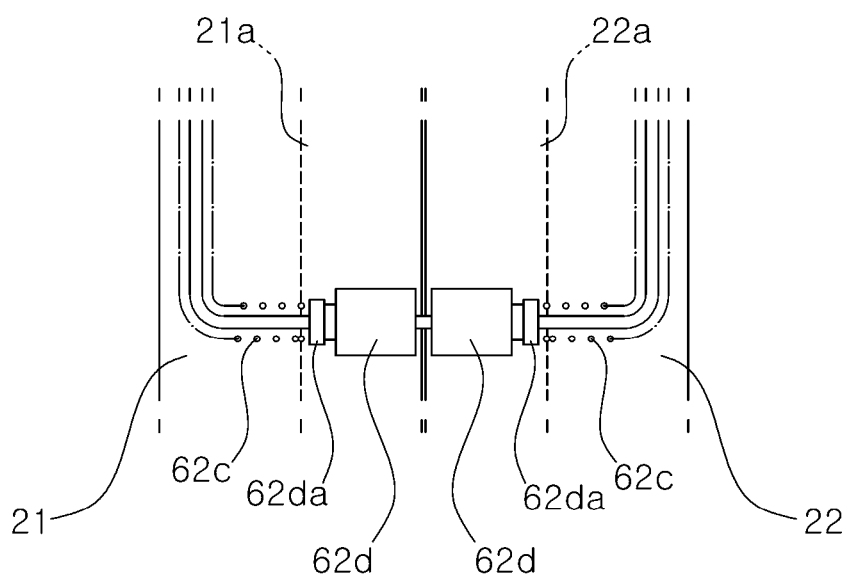
FIG. 9 is an enlarged diagram of a portion B of FIG. 5.
Figure 10:
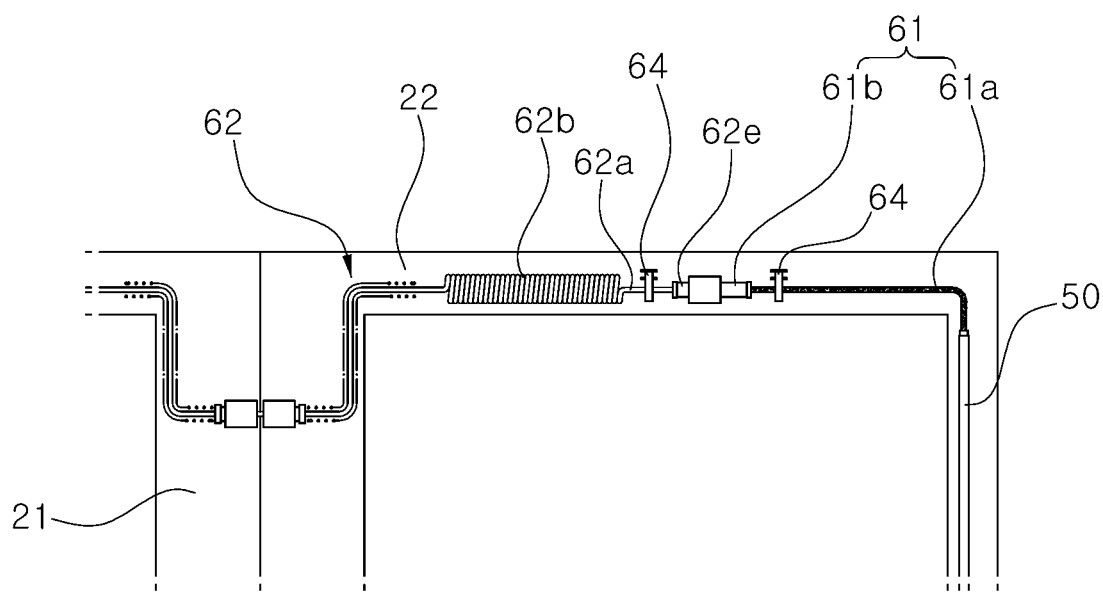
FIG. 10 is an enlarged diagram of a portion C of FIG. 5.
Figure 11:
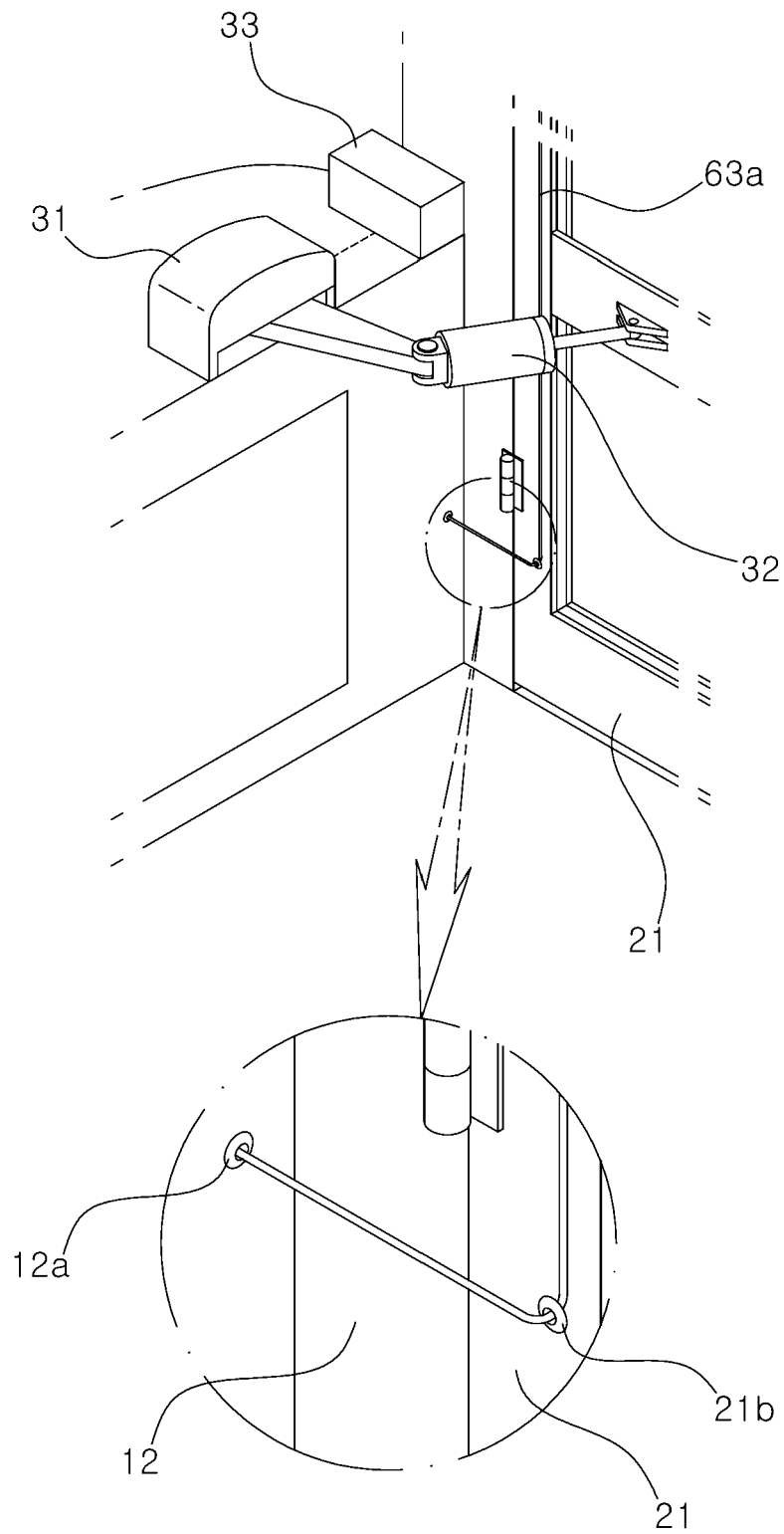
FIG. 11 is an enlarged diagram of a portion D of FIG. 5.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, a wire assembly for an anti-pinch sensor for a vehicle according to embodiments of the present disclosure will be described in detail with reference to the accompanying drawings.

A wire assembly for an anti-pinch sensor for a vehicle according to embodiments of the present disclosure may be applied to a folding door 20 composed of a first member 21 hinge-connected to a vehicle body for a vehicle and a second member 22 foldably installed on the first member 21 in the vehicle such as a bus.

Since the first member 21 is connected to an actuator 31 operated under a control of a controller 33 through a rod 32, when the controller 33 performs an opening control with the actuator 31, the actuator 31 may pull the first member 21 so that the first member 21 and the second member 22 are folded, thereby opening the folding door 20. In addition, when the controller 33 performs a closing control with the actuator 31, the actuator 31 may push the first member 21, and the first member 21 and the second member 22 are unfolded, thereby closing the folding door 20.

An anti-pinch sensor 50 may be installed to detect that a passenger is pinched to one side of the second member 22, that is, a portion where the second member 22 is in contact with the vehicle body when the folding door 20 is closed. The anti-pinch sensor 50 may be installed in a weather strip installed on a portion where the second member 22 is in contact with the vehicle body.

When the pinch occurs between the second member 22 and the vehicle body while folding door 20 closing, the anti-pinch sensor 50 may detect the pinch to transmit a pinch signal to the controller 33. When receiving the pinch signal, the controller 33 may control the actuator 31 to open the folding door 120 again so that the folding door 20 is opened.

When the anti-pinch sensor 50 is installed on the second member 22, an installation space may not be required compared to a case where the anti-pinch sensor 50 is installed on the vehicle body, thereby increasing an opened area of the folding door 20 when the folding door 20 is opened. However, the wire connecting the anti-pinch sensor 50 with the controller 33 may be installed in the first member 21 and the second member 22 that repeats folding and unfolding, thereby lowering durability.

To solve this problem, by applying the wire assembly according to embodiments of the present disclosure, it is possible to secure durability even when the anti-pinch sensor 50 is installed on the second member 22.

The wire assembly for the anti-pinch sensor for the vehicle according to embodiments of the present disclosure may include a lead wire unit 61 connected to the anti-pinch sensor 50, a center wire unit 62 having one end connected to the lead wire unit 61 and installed on a folded portion of the door 20, and a connection wire unit 63 having one end connected to the other end of the center wire unit 62, having the other end connected to the controller 33, and drawn out to the outside from the inside of the door 20 through the door 20.

The lead wire unit 61 may be installed in the second member 22, the center wire unit 62 may be installed over the first member 21 and the second member 22, a part of the connection wire unit 63 may be installed in the first member 21, and the rest of the connection wire unit 63 may be connected to the controller 33 through the first member 21 and a step panel 12 of the vehicle. The lead wire unit 61, the center wire unit 62, and the connection wire unit 63 may be installed along an inner circumference of the door 20 to electrically connect the anti-pinch sensor 50 with the controller 33.

The lead wire unit 61 may include a lead wire 61*a* electrically connecting the anti-pinch sensor 50 with the center wire unit 62 and a connector 61*b* provided on the end of the lead wire 61*a* and connected to the center wire unit 62.

The lead wire 61*a* may be formed of a conductive wire and a sheath to transmit the pinch signal of the anti-pinch sensor 50.

The lead wire unit 61 may be installed along the circumference of the second member 22 to electrically connect the anti-pinch sensor 50 with the center wire unit 62.

The lead wire unit 61 may be fixed to the second member 22 with a cable tie 64 on a portion adjacent to the end of the lead wire unit 61, that is, at a location adjacent to the connector 61*b*, and therefore, its position can be maintained even when the folding door 20 is repeatedly folded or unfolded.

The center wire unit 62 may include a center wire 62*a* connecting the lead wire unit 61 with the connection wire unit 63, a coil unit 62*b* having the center wire 62*a* wound in a coil form from the center of the center wire 62*a* and expanded and contracted in a longitudinal direction of the center wire unit 62, and a wire cover 62*c* wound around the outside of the center wire 62*a*.

The center wire unit 62 may be installed over an upper circumference of the first member 21 and an upper circumference of the second member 22 and exposed to the outside from folded portions of the first member 21 and the second member 22.

Since the center wire unit 62 also needs to transmit an electrical signal, it basically has a structure of a wire having a conductive wire and a sheath. The center wire 62a may electrically connect the lead wire unit 61 with the connection wire unit 63 to transmit the pinch signal of the anti-pinch sensor 50 to the controller 33.

The coil unit 62b may be formed in some sections of the center wire unit 62. The coil unit 62b may be formed by forming the center wire 62a in the coil form. Since the coil unit 62b can be expanded and contracted in the longitudinal direction of the center wire unit 62, the coil unit 62b may absorb a change in a length of the center wire unit 62 when the first member 21 and the second member 22 are repeatedly folded or unfolded. As described above, the coil unit 62b may absorb the change in the length of the center wire unit 62, thereby improving the durability of the wire assembly.

The wire cover 62c may be formed of a metal cable and formed to wind the outside of the center wire 62a. The wire cover 62c may wind most sections of the center wire unit 62 other than a portion where the coil unit 62b and the center wire 62a are connected to a connector 62e. The wire cover 62c may protect the center wire 62a. Therefore, since it is possible to prevent the center wire 62a from being in direct contact with the frames of the first member 21 and the second member 22 or center weather strips 21a, 22a, the center wire 62a may be smoothly moved when the folding door 20 is folded or unfolded.

Meanwhile, a portion of the center wire unit 62 penetrating the folded portion of the door 20 may be supported through a cable guide 62d.

The cable guide 62d may be made of synthetic resin injection molding, etc. and installed on portions where the first member 21 and the second member 22 are connected, respectively. The cable guide 62d may be formed in a cylindrical shape, and installed in the center weather strips 21a, 22a installed on the folded portion of the folding door 20, that is, the portion where the first member 21 and the second member 22 are connected. Since the cable guide 62d is formed in the cylindrical shape, the center wire 62a and the wire cover 62c may penetrate the cable guide 62d, and the cable guide 62d may support the outside of the wire cover 62c. Since a rear end of the cable guide 62d is formed with a hook 62da, it may be firmly fastened to the door frames of the first member 21 and the second member 22 or the door sides such as the center weather strips 21a, 22a in a hook manner. For example, the hook 62da may pass through center weather strips 21a, 22a and may be fixed to center weather strips 21a, 22a.

The connector 62e connected to the lead wire unit 61 and the connection wire unit 63 may be formed on both ends of the center wire unit 62, respectively. The connector 62e may be mechanically coupled to the connector 61b of the lead wire unit 61 and a connector 63b of the connection wire unit 63, respectively to firmly connect the lead wire unit 61, the center wire unit 62, and the connection wire unit 63.

In addition, the center wire unit 62 may be fixed to the door 20 with the cable tie 64 at a position adjacent to the connector 62e. Therefore, even if the folding door 20 is repeatedly operated, its position may be maintained.

The connection wire unit 63 may include a connection wire 63a connecting the center wire unit 62 with the controller 33 and the connector 63b provided on the end of the connection wire 63a and connected to the center wire unit 62.

Like the lead wire 61a and the center wire 62a, the connection wire 63a also basically may have a wire structure for transmitting the electrical signal.

The connection wire unit 63 may also be fixed to the door 20 with the cable tie 64 at a position adjacent to the connector 63b.

A part of the connection wire unit 63 may be installed on the circumference of the first member 21, and the rest of the connection wire unit 63 may be drawn out to the outside through the first member 21, and then, inserted into the vehicle through the step panel 12 of the vehicle and connected to the controller 33. Grommets 21b, 12a may be installed on a portion where the connection wire unit 63 penetrates the first member 21 and the step panel 12 for sealing and supporting the connection wire unit 63.

Figure 12A:
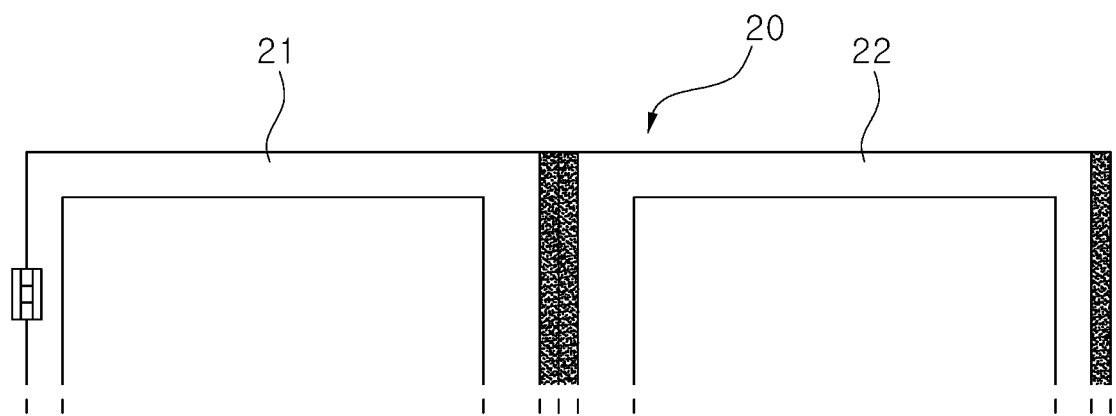
FIGS. 12A to 12D are schematic diagrams showing a state of a folded portion of the folding door to which the wire assembly for the anti-pinch sensor for the vehicle according to embodiments of the present disclosure is applied depending upon an opening or closing step of the door.
Figure 12B:
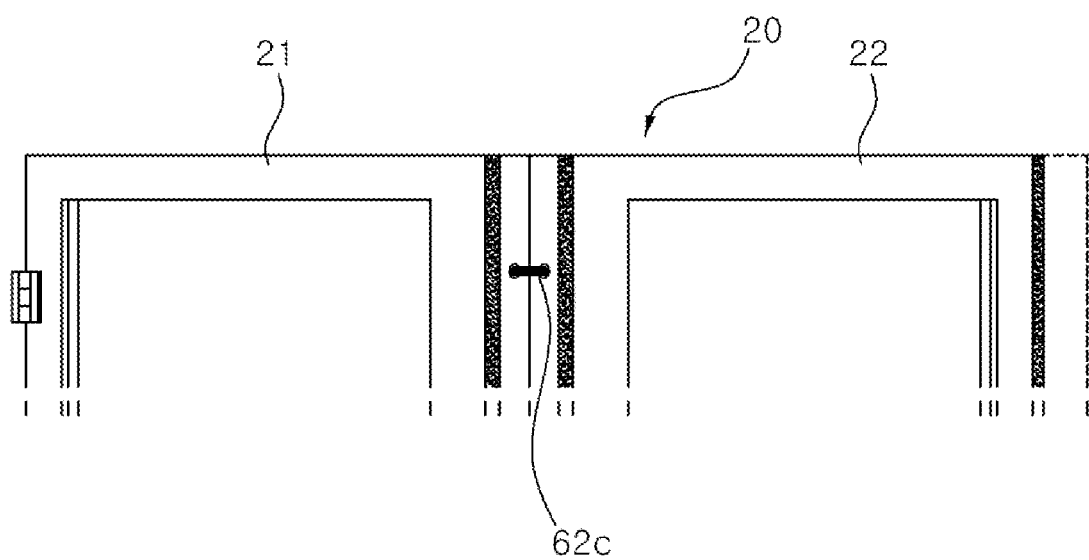
Figure 12C:
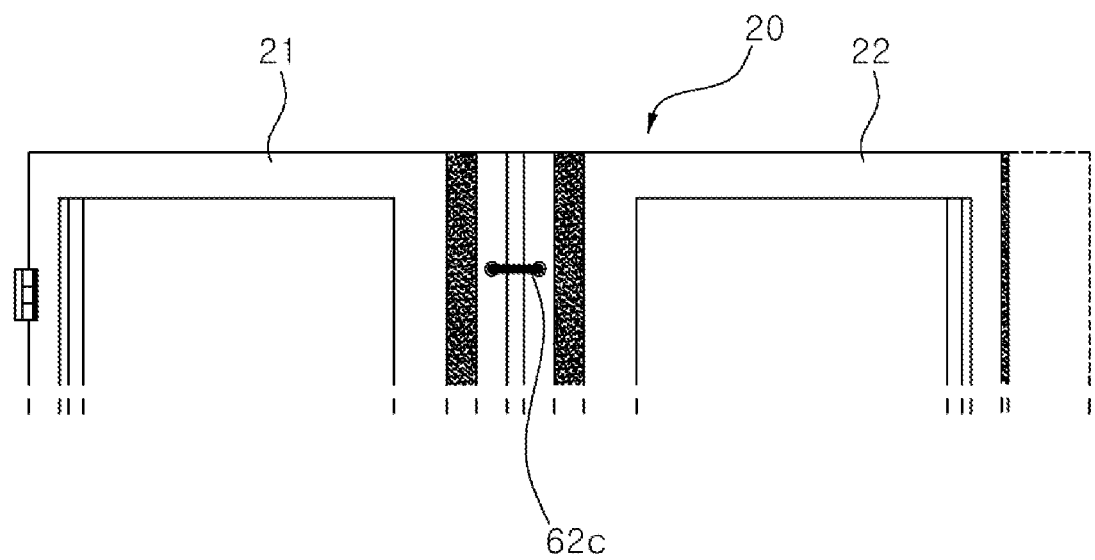
Figure 12D:
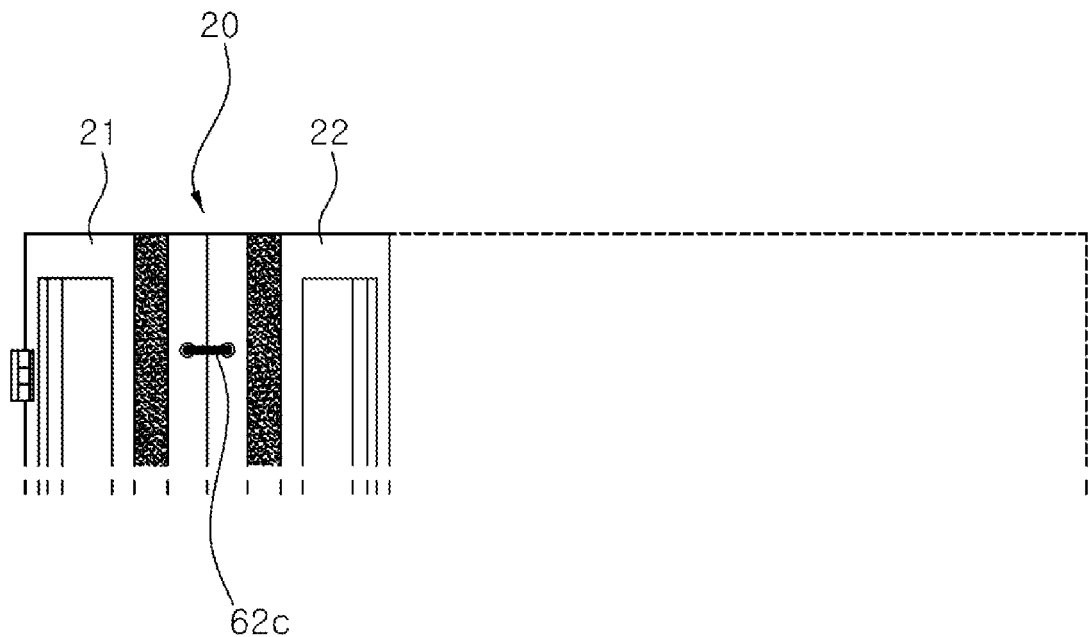

FIGS. 12A to 12D show a state where the center wire unit 62 may be exposed for each state upon the opening or closing operation of the folding door 20. As the folding door 20 is opened from a state where the folding door 20 is closed (see FIG. 12A), the exposure amount of the center wire unit 62 may increase and become the maximum in a state where the folding door 20 is fully opened. Conversely, when the folding door 20 is closed, the exposure amount of the center wire unit 62 may be gradually reduced.

Meanwhile, even if the opening or closing of the folding door 20 is repeated and therefore, a part of the center wire unit 62 is exposed and the folding process is repeated, the folding door 20 may be smoothly operated because the change of the length according to the expansion and contraction is absorbed by the coil unit 62b and the wire cover 62c reduces the friction with the center wire 62a.

What is claimed is:

1. A wire assembly comprising:
   an anti-pinch sensor;
   a lead wire unit configured connected to the anti-pinch sensor;
   a center wire unit having one end connected to the lead wire unit and configured to be installed on a vehicle door;
   a controller configured to control an opening or closing of the vehicle door; and
   a connection wire unit having one end connected to the other end of the center wire unit, having the other end connected to the controller;
   wherein the center wire unit comprises:
     a center wire connecting the lead wire unit with the connection wire unit;
     a coil unit having the center wire wound in a coil form from the center of the center wire and expanded and contracted in a longitudinal direction of the center wire unit; and
     a wire cover wound around the outside of the center wire;
   wherein the vehicle door is a folding door composed of a first member hinge-connected to a vehicle body and rotated by an actuator and a second member foldably installed on the first member;
   wherein the center wire unit is fixed to the second member installed with the anti-pinch sensor by a cable tie; and
   wherein the coil unit is disposed between the cable tie and an end of the second member hinge-connected to the first member.

2. The wire assembly of claim 1 wherein the anti-pinch sensor is configured to be installed on the vehicle door to detect the pinch between the door and vehicle.

3. The wire assembly of claim 1, wherein the wire cover is formed of a metal cable and formed to be wound around the outside of the center wire.

4. The wire assembly of claim 1, wherein a cable guide configured to support the outside of the wire cover is provided to prevent the wire cover from being pinched to the door when penetrating a folded portion of the door.

5. The wire assembly of claim 4, wherein the cable guide is installed in a center weather strip installed on the folded portion of the door.

6. The wire assembly of claim 4, wherein the cable guide is fixed to the door with a hook installed on a rear end of the cable guide on the folded portion of the door.

7. The wire assembly of claim 1, wherein a connector connected to the lead wire unit and the connection wire unit is formed on both ends of the center wire unit, respectively.

8. The wire assembly of claim 7, wherein the center wire unit is fixed to the door with the cable tie at a position adjacent to the connector.

9. The wire assembly for the anti-pinch sensor of claim 1, wherein the lead wire unit comprises:
   a lead wire electrically connecting the anti-pinch sensor with the center wire unit; and
   a connector provided on the end of the lead wire and connected to the center wire unit.

10. The wire assembly for the anti-pinch sensor of claim 9, wherein the lead wire unit is fixed to the door with another cable tie at a position adjacent to the connector.

11. The wire assembly for the anti-pinch sensor of claim 1, wherein the connection wire unit comprises:
    a connection wire connecting the center wire unit with the controller; and
    a connector provided on the end of the connection wire and connected to the center wire unit.

12. The wire assembly for the anti-pinch sensor of claim 11, wherein the connection wire unit is fixed to the door with another cable tie at a position adjacent to the connector.

13. The wire assembly for the anti-pinch sensor of claim 11, wherein the lead wire unit, the center wire unit, and the connection wire unit are installed along an inner circumference of the door.

14. A vehicle comprising a wire assembly,
    wherein the wire assembly comprises:
    an anti-pinch sensor;
    a lead wire unit configured connected to the anti-pinch sensor;
    a center wire unit having one end connected to the lead wire unit and configured to be installed on a door of the vehicle;
    a controller configured to control an opening or closing of the vehicle door; and
    a connection wire unit having one end connected to the other end of the center wire unit, having the other end connected to the controller, and drawn out to the outside from the inside of the vehicle door by passing through the vehicle door;
    wherein the vehicle door is a folding door composed of a first member hinge-connected to a vehicle body and rotated by an actuator and a second member foldably installed on the first member;
    wherein the center wire unit comprises:
      a center wire connecting the lead wire unit with the connection wire unit;
      a coil unit having the center wire wound in a coil form from the center of the center wire and expanded and contracted in a longitudinal direction of the center wire unit; and
      a wire cover wound around the outside of the center wire;
    wherein the center wire unit is fixed to the second member installed with the anti-pinch sensor by a cable tie; and
    wherein the coil unit is disposed between the cable tie and an end of the second member hinge-connected to the first member.

15. The vehicle of claim 14 wherein the anti-pinch sensor is installed on a portion where the second member is in contact with the vehicle body in a height direction of the vehicle, and the lead wire unit is installed in the second member.

16. The vehicle of claim 14, wherein the center wire unit is installed over the first member and the second member.

17. The vehicle of claim 14 wherein the connection wire unit has a part of the connection wire installed in the first member and has the rest of the connection wire connected to the controller through the first member and a step panel of the vehicle.

18. The vehicle of claim 14 wherein the anti-pinch sensor is installed on one side of the door and installed in a weather strip airtightly sealing between the door and the vehicle body when the door is closed.

* * * * *